United States Patent Office 3,689,313
Patented Sept. 5, 1972

3,689,313
CREASE-RESISTANT WOVEN COTTON SHEETING AND A PROCESS FOR ITS PRODUCTION
Ernest Sewell, Pointe du Lac, Quebec, Canada, assignor to Wabasso Limited, Montreal, Quebec, Canada
No Drawing. Continuation-in-part of application Ser. No. 706,626, Feb. 19, 1968. This application July 15, 1970, Ser. No. 55,249
Claims priority, application Canada, Oct. 27, 1967, 3,653
Int. Cl. D06m *15/70;* B23b *27/06*
U.S. Cl. 117—139.4
12 Claims

ABSTRACT OF THE DISCLOSURE

This invention relates to crease-resistant woven cotton sheeting and to a process for its production. The process of this invention renders woven cotton fabric crease-resistant while retaining or improving its tear strength and pliability by impregnating the sheeting with a mixture of the monomers (or prepolymers) of two resins and polymerising the two resins by the action of oxalic acid to produce a tough pliable resinous film on the cotton fibres. The impregnating mixture comprises an aldehyde-urea resin and an acid stable polyacrylate resin.

---

This application is a continuation-in-part of my application Ser. No. 706,626, filed Feb. 19, 1968, (now abandoned).

FIELD OF THE INVENTION

The present invention relates to the production of woven cotton fabric either in the form of sheeting or articles made therefrom which combines the useful properties of cotton with similar wash and wear characteristics to those possessed by certain artificial fibres such as nylon and terylene. Hence, it is possible by the process of this invention to make cotton pillowcases and bed sheets which do not require ironing and yet which retain that smooth and crisp appearance which is characteristic of freshly laundered cotton articles even after repeated machine washing and tumble drying.

Expressed in simple terms the present invention provides a process which comprises impregnating cotton sheeting with an aqueous dispersion of a combination of resins which are rapidly polymerised under acid conditions. The resulting treated cotton sheeting is crease-resistant. The new process while imparting the desirable property of crease-resistance either improves or has no detrimental effect on the other useful properties of cotton sheeting such as tear strength, abrasion resistance, fabric hand and shrinkage.

DESCRIPTION OF THE PRIOR ART

It has been known for many years as set out for example by Ellis in "The Chemistry of Synthetic Resins" volume I, pages 639–640 published in 1935 that certain resins, particularly urea-formaldehyde resins, impart crease resistance to certain fibres, including cotton. It has also been disclosed by various workers that coatings of amino resins can have significant effect on other properties of fabrics such as shrinkage, draping, fabric hand, inflammability and water repellency. However, while it has been possible by such methods to impart a certain measure of crease-resistance to cotton sheeting the resulting fabric has suffered a loss of break and tear strength and abrasion resistance which is obviously undesirable. In addition many of the coatings produced by such treatments were brittle and unpliable. Moreover in treating white cotton certain resins such as melamine-formaldehyde resins are unsuitable as the resin coating produced tends to yellow in use due to the fact that it absorbs chlorine from chlorine bleaches.

SUMMARY OF THE INVENTION

However it has now been found by the use of the process of the present invention that woven cotton sheeting and articles made therefrom may be treated to render them indefinitely crease-resistant, retain or improve their tear and abrasion resistance and pliability while overcoming all the disadvantages of the prior art processes. As has already been indicated briefly above, this desirable result has been achieved by treating cotton sheeting or articles made therefrom with a novel combination of resins. More particularly, the present invention comprises treating the cotton sheeting or articles made therefrom with a combination of two materials which are rapidly polymerised on the cotton sheeting by treatment with an aqueous solution containing oxalic acid. This treatment, produces a crease-resistant cotton sheeting bearing within its fibrous structure and being bonded to a tough and pliable composition. One of two materials is a monomer of an aldehyde-urea resin which is slowly polymerised by the action of an aqueous solution of oxalic acid. The second material is a monomer or prepolymer of an acid stable polyacrylate resin.

DESCRIPTION OF PREFERRED EMBODIMENTS

As indicated above one of the resins used in the process of this invention is an aldehyde-urea resin. It has been found that good results are produced by aldehyde-urea resins modified by the presence of methylol groups, especially such resins produced by the acid polymerization of dimethylol-aldehyde-urea monomers. In effecting the process of this invention, specific monomers which give excellent results are dimethylolethylene urea, dimethylolpropylene urea and dimethylolglyoxal urea, especially the latter.

It has been previously stated in the specification that the second resin-producing material used in the process of this invention is a monomer or prepolymer of a polyacrylate resin. Such resins are derived by copolymerizing at least two components namely acrylic acid and an acrylic acid ester. Preferably the polyacrylate resin contains units derived from the copolymerization of acrylic acid, an acrylic acid ester and an acrylic acid amide. As the process of this invention is effected in a strongly acid medium, preferably at a pH of 0.8 to 2.5, the dispersion of the monomer or prepolymer must be one that is stable to acid, i.e. it is not precipitated by acid. It has been found that by using as the monomer or prepolymer a plastics dispersion of the polyacrylate type with reactive groups good results are obtained. In particular it has been found that the plastics dispersion of the polyacrylate type with reactive groups sold by Badische Anilin & Soda-Fabrik AG (BASF) under the trademark Perapret HVN gives excellent results in the process of this invention. Perapret HVN is described by BASF as being a white aqueous film-forming dispersion containing approximately 20 to 25% of the active substance. Perapret HVN is an aqueous emulsion containing 20 to 25% of a terpolymer of acrylic acid, butyl acrylate and N-methylolacrylic acid methyl amide.

Hence, according to the process of this invention the mixture of the resin monomers (or monomer and prepolymer) is dissolved or dispersed in water, oxalic acid added, the cotton to be treated passed through the aqueous mixture, and the aqueous mixture absorbed by the cotton sheeting allowed to polymerize to form the desired product. Obviously, as will be readily apparent to those skilled in the art, these particular process steps are normally preceded and followed by one or more conventional steps and details of a modified process employing such steps will be given later in the disclosure of this specification.

The process of the present invention is effected in acid medium preferably at a pH of 0.8 to 2.5 in order to polymerize the resin monomers. Best results are achieved by operating at a pH of 1.0 to 1.6.

While the process of the present invention may be performed without any additional catalyst it is preferred to impregnate the cotton sheeting with the resins in the presence of a swelling agent for the cotton fibres. Ammonium salts are suitable swelling agents such as ammonium chloride, ammonium nitrate or ammonium sulphate, the chloride being particularly suitable.

Similarly although the use of a wetting agent is not essential it has been found that more complete impregnation of the cotton sheeting can be effected if one is used. Any suitable wetting agent may be used but it is preferred to use a non-ionic wetting agent such as that produced by the sulphonation of alkylphenol polyglycol ethers, alkylpolyalkylene ethers, and ethoxylated straight chain alcohols. However while the process of the present invention is equally useful for treating dyed, printed or white cotton sheeting, or articles prepared therefrom, the results are particularly pleasing in the case of white goods. When the process is used in the treatment of white cotton it is preferable to incorporate an optical brightening agent in the aqueous solution containing the resin-producing materials. Obviously such an optical brightener must be stable under the acidic conditions used and be compatible with both the acrylate dispersion and the wetting agent. In order to avoid difficulties of this type the wetting agent should be non-ionic in character. While the reaction conditions and amounts of materials used in the process of this invention may vary within wide limits they should be selected so as to produce the optimum desired result. Hence, the aqueous impregnation solution or dispersion should preferably contain about 10 to 20% of the aldehyde-urea resin monomer and about 1.5 to 5% of the polyacrylate monomer or prepolymer the quantities of the two materials being so selected that the ratio of aldehyde-urea resin to polyacrylate monomer or prepolymer is preferably between 10:1 and 25:1, preferably about 10:1. The amount of oxalic acid used should be such that it produces an aqueous solution of the desired working pH. The desired pH range is achieved by using an aqueous mixture containing about 5.5% of the acid. Again the amount of wetting agent used will depend on its ratio but in the case of non-ionic wetting agents will usually be about 0.3%.

After impregnating the woven cotton sheeting with mixtures of resins as previously described and polymerising the resins in the presence of oxalic acid it may then be submitted according to a preferred feature of the invention to a series of conventional steps. Hence, according to a preferred embodiment of the invention the impregnated cotton sheeting is passed through the following additional steps:

(1) It is dried to a particular moisture content preferably so that about 8 to 12% of the resin remains in the material. This may be effected by drying at a temperature of about 230 to 250° F.;
(2) The cotton sheeting is set to width;
(3) It is pressed and tightly rolled under tension with exclusion of air;
(4) The rolled fabric is aged for a period of between 5 to 14 days preferably 7 days at a temperature of 70 to 80° F.;
(5) The cotton is unrolled and thoroughly washed to remove any excess acid with neutralisation of any excess acid being made with a base such as caustic soda or ammonia if necessary; and
(6) The cotton is finally rolled and dried.

In the case of the treatment of dyed goods the process of this invention should be performed after the dyeing of the fabric.

The following example is provided to further illustrate the present invention.

EXAMPLE

An aqueous mixture was prepared from the following materials:

300 lbs. of a 50% aqueous solution of dimethylolglyoxal urea resin moner
100 lbs. ammonium chloride
25 lbs. of Perapret HVN (20 to 25% aqueous dispersion) (Perapret HVN is a trademark of Badische Anilin & Soda- Fabrik AG for an aqueous emulsion containing 20 to 25% of a terpolymer of acrylic acid, butyl acrylate and N-methylolacrylic acid methyl amide)
55 lbs. of oxalic acid
5 lbs. of a 30% solution of a non-ionic wetting agent (a sulphonated alkyl-aryl polyglycol ether)
20 lbs. optical brightener (a stilbene derivative)
Water to 100 gallon total.

The dimethylolglyoxal urea monomer is dissolved in water, then the oxalic acid and ammonium chloride added followed by the Perapret HVN. The optical brightener is then added as an aqueous solution followed by the wetting agent to give a solution having a pH of about 1.0. Bleached cotton sheeting was passed through the resulting aqueous mixture at 60 to 70° F. to give a liquid pick-up of about 65%.

The impregnated cotton sheeting was then dried at 230 to 250° F. until about 9 to 11% of the resin remained in the cotton. It was then tightly rolled under maximum tension so as to produce a warp and weft of 7% with the exclusion of air.

The resulting covered rolls were then stored of 7 to 14 days at normal temperature (70° to 80° F.) to age.

The cotton was then unrolled and thoroughly washed with cold water until the pH was about 5, and then completely neutralized with hot alkali (soda ash) wash water, and finished in a weak ammonia solution.

It is estimated that the finished fabric contains about 8.0% to 9.0% permanently fixed resin.

The treated cotton was then compared with similar but untreated cotton and the results are listed in the following table.

| | Treated | Untreated |
|---|---|---|
| Breaking strength, p.s.i.: | | |
| Warp | 58 | 71.6 |
| Weft | 47.8 | 57.8 |
| Tearing strength, lbs.: | | |
| Warp | 1.93 | 3.02 |
| Weft | 1.67 | 2.70 |
| Abrasion (Taber), C | 141.6 | 65 |
| Shrinkage (Tumble-dry), percent: | | |
| Warp | 1.5 | 8.66 |
| Weft | 1.39 | 1.6 |
| Crease recovery (wet and dry), deg | 272.2 | Nil |
| Wash and wear evaluation, class | 4 | 1 |

The finish imparted to the cotton sheeting is permanent and of excellent wash fastness; the deterioration of the cotton fibres is very small, approximately 15% when shown as breaking strengths.

To summarize the results produced by the process just described will give cotton sheeting and cotton pillow cotton that will resist wrinkles when wet and dry, will dry up after wetting (washing) to remain smooth and will not require ironing. Such cotton sheeting and pillow cotton will have the following properties:

(1) A dry crease angle of 260–280° and a wet crease angle of 260–280° (as measured in the Monsanto Test);

(2) It is a permanent dry and wet wrinkle free fabric having a No. 4 rating in the AATCC Test for fabric evaluation after 20 washings:
(3) Better abrasion resistance than any treated cotton sheeting and pillow cotton;
(4) Satisfactory tear strength (as shown by results in the Elmendorf Method);
(5) They are stabilized fabrics having a shrinkage of less than 2% both warp and weft after 20 washings followed by tumble drying; and
(6) They can be washed by normal laundry methods and tumble dried for use in normal household purposes without further pressing or ironing.

The various tests used in testing the cotton as stated above were performed as follows:

Abrasion test

The machine used for the abrasion test was a Model 503 Taber Abraser designed exclusively for use in determining the abrasion resistance of fabrics or cloth durability when the specimen is subjected to rotary rubbing action under controlled conditions of pressure and abrasive action.

The test samples positioned on the machine are subjected to rotary rubbing action by an abrasive wheel while being held uniformly taut, and the abrasion of each specimen is stopped at the first appearance of broken thread or a pin hole. The reading of each specimen is evaluated by the number of cycles required to produce the first pin hole or yarn breakdown, and an average of 5 specimens taken from both treated and untreated cotton are recited in the table above. In these particular tests head weights of 500 and 1000 grams and an abrasive wheel No. H–38 and vacuum setting at 50 were used.

The Taber Abraser required an average of 141.6 cycles to break down the cotton treated according to the above process, but an average of only 65 cycles to break down similar but untreated cotton, clearly indicating the greatly increased abrasion resistance of the treated fabric.

Wrinkle recovery test

The crease or wrinkle recovery test was performed on a special machine designed for this purpose manufactured by T. J. Edwards Inc., of Jamaica Plain, Boston, Mass. The test is effected by creasing and compressing a test specimen under measured conditions of time and load. The specimen under test is then allowed to recover in the wrinkle recovery tester and the recovery angle measured. The fabric to be tested is conditioned at 65±2% relative humidity and at a temperature of 70±2° F. for at least six hours and should be flat and free of wrinkles.

In the test at least ten (five in each direction) 1.5 x 4.0 cm. test specimens were cut from the cotton sheeting, the long dimension representing the direction of the test. This can be conveniently done by using a die being careful to align the short edges of the specimen with the yarns in the fabric.

A test specimen was placed between the metal leaves of the specimen holder with one end flush with the longer metal strip.

The exposed end of the specimen was turned back so that its edge fell on a line on the shorter thin-metal leaf. Specimens should be handled with care to avoid getting moisture from the fingers on the region to be creased.

The specimen holder was taken with the fabric specimen looped back, in the left hand and the left thumbnail was firmly pressed on the edge of the specimen to hold it on the guide line. With the right hand the plastic press was opened and the holder and specimen inserted. The press should be held so that the jaw having a small raised platform is outside of and parallel to the longer metal strip of the holder. The flat thicker side of the press is then adjacent to the fabric specimen. The end-edge of the jaw was brought into firm contact with the fabric at the left thumbnail and the press closed. This procedure formed a crease about 1/16 inch from the end of the thin metal leaf.

The press-holder combination was inverted on a table top with the small platform upward and a load applied of 500 grams to the platform for five minutes.

The press was unloaded, the holder carefully removed, and mounted in the tester. The mounting is readily effected by placing the back edge of the holder against the stop at the back of the shelf on the tester and gently pushing the holder into position. The crease should line up with a spot at the center of the outer disc of the tester.

The dangling leg of the specimen was aligned with the vertical guide line on the back panel. The alignment was periodically readjusted as the specimen recovered and finally the protractor reading was taken after a five minute recovery period. The short lines on either side of the reading index are 2° apart to facilitate estimates between the 10° intervals.

Evaluation.—The data was reported as the crease recovery angle. The warp and filling readings were averaged separately and reported to the nearest 1°.

The untreated cotton has no recovery, but the treated fabric has an average crease recovery of 272.2°.

Tear strength

The tearing strength readings are obtained by subjecting fabric samples to tearing at very high rates of the order of about 500 inches per minute. The energy required to propagate a tear in the fabric is provided by a falling pendulum, and from the energy lost by the pendulum the equivalent average tearing force is determined. The apparatus used in determining the values recited in the above table was the Elmendorf Tearing Tester Model 60–400. While the readings obtained do indicate a lowering of the tearing strength of the treated cotton fabric the loss is negligible when compared with the crease-resistance and abrasion-resistance advantages obtained.

Break strength

The break test involves tensioning samples in both the warp and fill (weft) directions and recording the breaking load of each sample and averaging the results from the treated and untreated specimen samples. While treatment does appear to lower the pounds per square inch breaking load the lowering is not appreciable and amounts only to approximately 15%. This is conveniently done by using a Model J Scott Tester.

Wash and wear evaluation

The Wash-and-Wear and Permanent Press evaluations are as prescribed by the American Association of Textile Chemists and Colorists (AATCC), and the class values are obtained by a visual comparison (under controlled conditions) of home laundered and dried sample against standard plastic replicas. The evaluation is broken down to Classes 1 through 5, with Class 1 representing the highly creased appearance of laundered untreated cotton sheeting, and Class 5 the original smooth and surface textured appearance. It will be noted from the above table that the treated fabric after repeated laundering and drying is classed in Class 4 closely simulating the original appearance of the fabric.

The small loss of breaking and tearing strength due to the present treatment is unimportant when one considers the highly improved abrasion resistance, and crease recovery and wash-and-wear evaluation, and the almost negligible shrinkage (less than 2%) in the treated product.

What I claim as my invention is:
1. A process for treating woven cotton sheeting so as to render the said sheeting crease-resistant while retaining tear strength and pliability which comprises:
   (a) treating a mixture of an aqueous dispersion of an acid stable polyacrylate resin containing units derived from an acrylic acid and an acrylic acid ester, and a monomer of an amino resin formed by the reaction of urea and an aldehyde, with oxalic acid, said aqueous dispersion being comprised of about 10 to 20 percent by weight of said amino resin and about 1.5 to 5 percent by weight of said acid-stable acrylate resin;

(b) impregnating the cotton sheeting with the resulting aqueous mixture; and (c) allowing the said aqueous mixture to polymerize and form a resinous film on the fibres of the cotton sheeting.

2. A process according to claim 1 in which the acid stable acrylate resin is a terpolymer containing units derived from acrylic acid, and acrylic acid ester and an acrylic acid amide.

3. A process according to claim 1 in which the acid stable acrylate resin is a terpolymer containing units derived from acrylic acid, butyl acrylate and N-methylol acrylic acid methyl amide.

4. A process according to claim 1 wherein the ratio of the amino resin to acrylate resin is between about 10:1 and 25:1.

5. A process according to claim 1 wherein the amino resin is selected from the group consisting of dimethylol-ethylene-urea, dimethylolpropylene-urea and dimethylolglyoxal-urea.

6. A process according to claim 5 wherein the process is effected at a pH of between 0.8 and 2.5.

7. A process according to claim 1 wherein said mixture further comprises a swelling agent.

8. A process according to claim 7 wherein said swelling agent is selected from the group consisting of ammonium chloride, ammonium nitrate and ammonium sulfate.

9. A process according to claim 1 wherein said mixture further comprises a non-ionic wetting agent.

10. A process according to claim 9 wherein said non-ionic wetting agent is a sulphonated alkyl-aryl polyglycol ether.

11. A process according to claim 1 wherein said mixture further comprises an optical brightening agent.

12. A process for treating woven cotton sheeting so as to render the said sheeting crease-resistant while retaining tear strength and pliability which comprises:

(a) treating a mixture of an aqueous dispersion of a mixture of water insoluble resins said aqueous dispersion containing about 10 to 20 percent by weight of an amino resin selected from the group consisting of dimethylolethylene-urea, dimethylolpropylene-urea and dimethylolglyoxal-urea and about 1.5 to 5 percent of an acid stable acrylate resin containing units derived from acrylic acid, butyl acrylate and N-methylolacrylic acid methyl amide with oxalic acid at pH 1.0 to 1.6, (b) impregnating the cotton sheeting with the resulting aqueous mixture, and (c) allowing the said aqueous mixture to polymerise and form a resinous film on the fibres of the cotton sheeting.

References Cited
UNITED STATES PATENTS

| | | | |
|---|---|---|---|
| 2,898,238 | 8/1959 | Van Loo et al. | 117—139.4 |
| 2,950,553 | 8/1960 | Hurwitz | 117—143 X |
| 3,181,927 | 5/1965 | Roth et al. | 8—116.3 |
| 3,220,869 | 11/1965 | Ruemens et al. | 117—134 X |
| 3,285,770 | 11/1966 | Hegemann et al. | 117—33.5 |
| 3,018,287 | 1/1962 | Fleck | 117—33.5 X |
| 2,536,050 | 1/1951 | Fluck | 117—139.4 |
| 2,987,421 | 6/1961 | Sherwood | 117—139.4 |
| 3,377,249 | 4/1968 | Marco | 8—115.6 |

WILLIAM D. MARTIN, Primary Examiner

T. G. DAVIS, Assistant Examiner

U.S. Cl. X.R.

117—33.5 T, 139.5 A, 143 A